(12) United States Patent
Yoon (10) Patent No.: US 8,415,040 B2
(45) Date of Patent: Apr. 9, 2013

(54) SECONDARY BATTERY MODULE CONTAINING TEMPERATURE SENSOR AND SEALING MEMBER SURROUNDING CONDUCTIVE WIRE OF TEMPERATURE SENSOR

(75) Inventor: Jihyoung Yoon, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 422 days.

(21) Appl. No.: 12/659,132

(22) Filed: Feb. 26, 2010

(65) Prior Publication Data

US 2010/0215999 A1  Aug. 26, 2010

(30) Foreign Application Priority Data

Feb. 26, 2009  (KR) .................. 10-2009-0016324

(51) Int. Cl.
*H01M 2/00* (2006.01)
*H01M 10/48* (2006.01)
*H01M 10/50* (2006.01)
*H01M 6/42* (2006.01)
*H01M 6/46* (2006.01)

(52) U.S. Cl. .............. 429/62; 429/61; 429/90; 429/149; 429/151; 429/156; 429/158; 429/159

(58) Field of Classification Search .................... 429/90, 429/61, 62, 149, 151, 156, 158, 159
See application file for complete search history.

(56) References Cited

U.S. PATENT DOCUMENTS

| 5,837,398 A | * | 11/1998 | Adams et al. | ............... 429/174 |
| 6,610,439 B1 | * | 8/2003 | Kimoto et al. | ............... 429/90 |
| 2005/0186471 A1 | * | 8/2005 | Titschert et al. | ............ 429/175 |
| 2006/0028183 A1 | | 2/2006 | Izawa et al. | |
| 2006/0103346 A1 | | 5/2006 | Misu et al. | |

FOREIGN PATENT DOCUMENTS

| JP | 10-302847 A | 11/1998 |
| JP | 2001-236937 A | 8/2001 |
| JP | 2005-122987 A | 5/2005 |
| JP | 2006-035942 A | 2/2006 |
| JP | 2006-140054 A | 6/2006 |
| JP | 2008-243589 A | 10/2008 |
| KR | 10 2008-0034625 A | 4/2008 |
| WO | WO 2006067903 A1 * | 6/2006 |

OTHER PUBLICATIONS

Kanai et al., Machine translation of WO 2006/067903 A1, Jun. 2006.*
Korean Notice of Allowance in KR 10-2009-0016324, dated Sep. 28, 2011 (YOON).

* cited by examiner

*Primary Examiner* — Basia Ridley
*Assistant Examiner* — Sean P Cullen
(74) *Attorney, Agent, or Firm* — Lee & Morse, P.C.

(57) ABSTRACT

A secondary battery module including a plurality of battery cells, a temperature sensor disposed on a surface of at least one of the battery cells, a conducting wire connected to the temperature sensor, a module frame coupled to the battery cells, fixing the battery cells in a position and having a wire hole through which the conducting wire passes, and a sealing member surrounding the conducting wire and coupled to the wire hole, sealing the wire hole.

12 Claims, 6 Drawing Sheets

SECONDARY BATTERY MODULE CONTAINING TEMPERATURE SENSOR AND SEALING MEMBER SURROUNDING CONDUCTIVE WIRE OF TEMPERATURE SENSOR

BACKGROUND

1. Field

Embodiments relate to a secondary battery module.

2. Description of the Related Art

Recently, electric and hybrid electric vehicles have been in the spotlight to alleviate atmospheric pollution caused by gasoline and diesel vehicles using fossil fuels. Electric and hybrid electric vehicles require a battery to drive a motor and may use, e.g., a rechargeable secondary battery. Such a battery may supply voltage and power sufficient to drive a motor. The battery may be in the form of a battery module in which a plurality of battery cells are connected to each other in series.

When the temperature of each battery cell in the battery module increases, the battery cell may explode due to gas generated inside the battery cell. Therefore, vents may be disposed on the top of the battery cells and may open when gas is generated inside the battery cell to discharge the gas. However, once the vents are opened, the battery cells may not be reused. Therefore, it is necessary to control the temperature of the battery cell in advance in order to prevent generation of gas.

SUMMARY

Embodiments are therefore directed to a secondary battery module, which substantially overcomes one or more of the problems due to the limitations and disadvantages of the related art.

It is therefore a feature of an embodiment to provide a battery module having a fixed temperature sensor on a surface of a battery cell, enhancing the cooling efficiency of the battery module.

At least one of the above and other features and advantages may be realized by providing a secondary battery module including a plurality of battery cells each battery cell having a surface, a temperature sensor disposed on the surface of at least one of the battery cells, a conducting wire connected to the temperature sensor, a module frame coupled to the battery cells and fixing the battery cells in a position, the module frame having a wire hole through which the conducting wire passes, and a sealing member surrounding the conducting wire and coupled to the wire hole and sealing the wire hole.

The sealing member may include at least one of ethylene propylene diene M-class (EPDM) rubber, ethylene propylene (EP) rubber, natural rubber, chloroprene rubber (CR), and nitrile butadiene rubber (NBR).

The wire hole may have an inside, and the sealing member may be coupled to the inside of the wire hole by the application of external pressure.

The secondary battery module may include a plurality of the sealing members, the battery cells may be cylindrical battery cells, and one sealing member may face and apply pressure to at least one other sealing member to couple the other sealing member to the wire hole.

The module frame may include end plates, and the end plates may apply pressure to the sealing member to couple the sealing member to the wire hole.

The wire hole may include an inner wall and a center, the sealing member may include a side wall, an axis may pass through the center of the wire hole, and an angle between the inner wall of the wire hole and the axis may be greater than an angle between the side wall of the sealing member and the axis.

The sealing member may be in the wire hole.

The battery cells may be polygonal battery cells, the module frame may include cell separators between the battery cells, the cell separators having a surface and bosses on the surface, and the wire hole may be on the cell separators and disposed between the bosses.

The battery cells may be polygonal battery cells, the module frame may include cell separators between the battery cells, the cell separators having a surface and bosses arranged at a regular interval on the surface, and the wire hole may be disposed on the cell separator in place of at least one of the bosses.

The wire hole may include an inner wall and a center, the sealing member may include a side wall, an axis may pass through the center of the wire hole, and an angle between the inner wall of the wire hole and the axis may be less than an angle between the side wall of the sealing member and the axis.

The bosses may have a height, the sealing member may protrude from the wire hole to have a height, and the height of the sealing member may be the same as the height of the bosses.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0016324, filed on Feb. 26, 2009, in the Korean Intellectual Property Office, and entitled: "Secondary Battery Module and Fabricating Method for the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
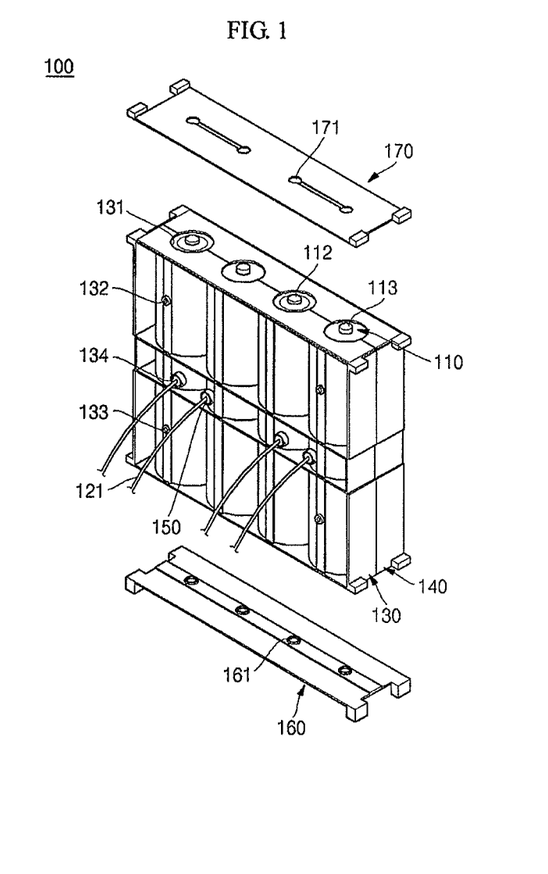
FIG. 1 illustrates an exploded perspective view of a secondary battery module according to an embodiment.
Figure 2:
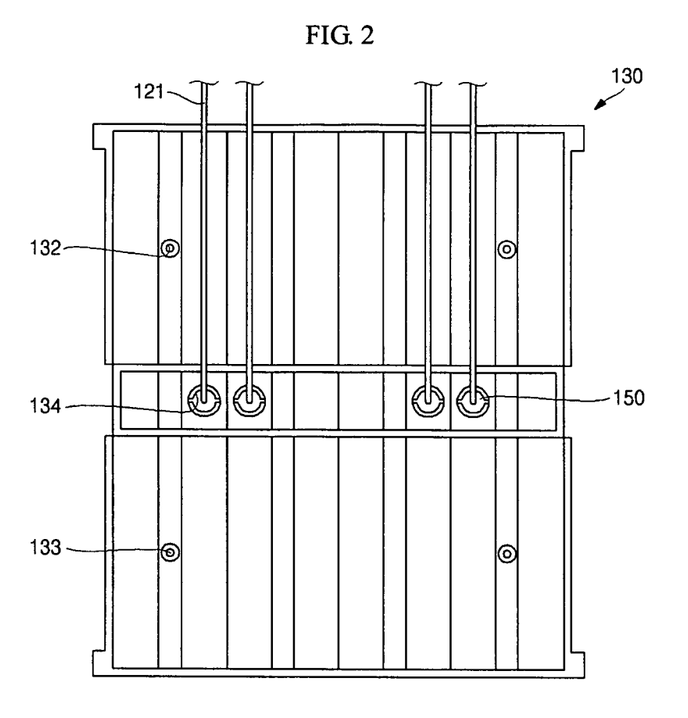
FIG. 2 illustrates a front view of the secondary battery module of FIG. 1.
Figure 3:
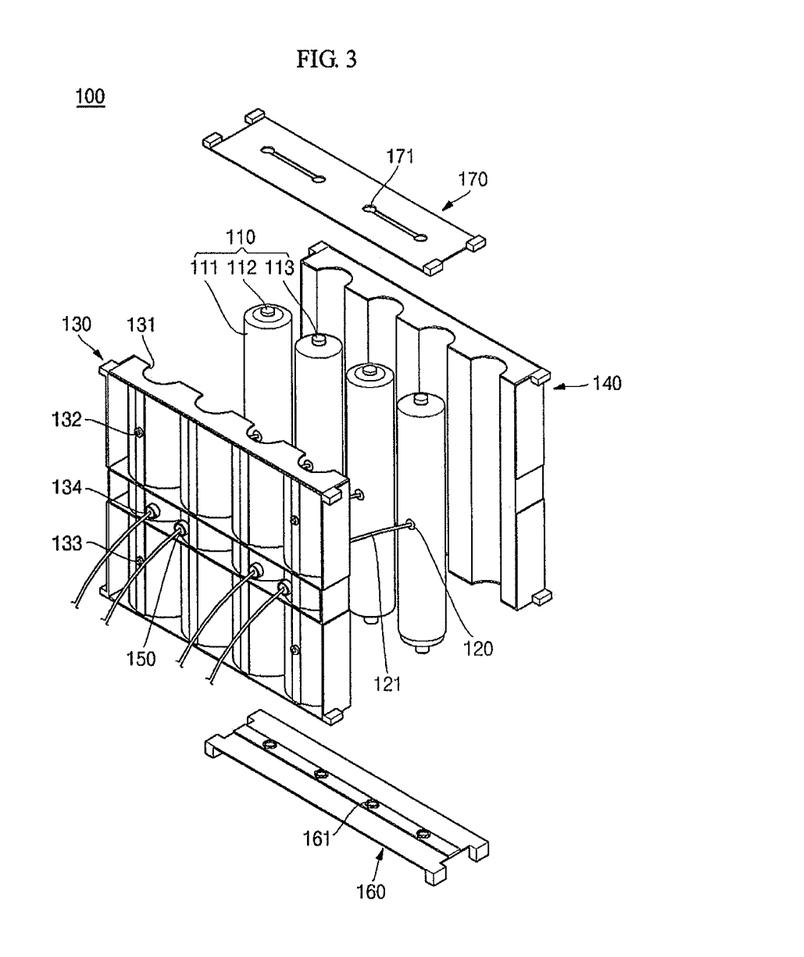
FIG. 3 illustrates an exploded perspective view of a connection between battery cells and temperature sensors in the secondary battery module of FIG. 1.
Figure 4:
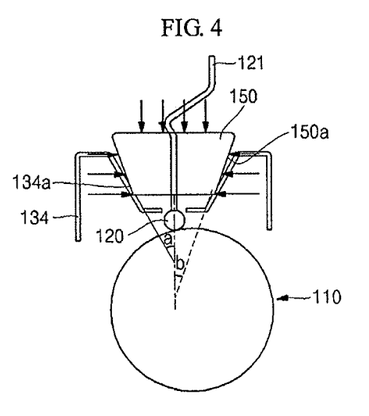
FIG. 4 illustrates a view schematically showing a connection between a module frame and a sealing member in the secondary battery module of FIG. 1.
Figure 5:
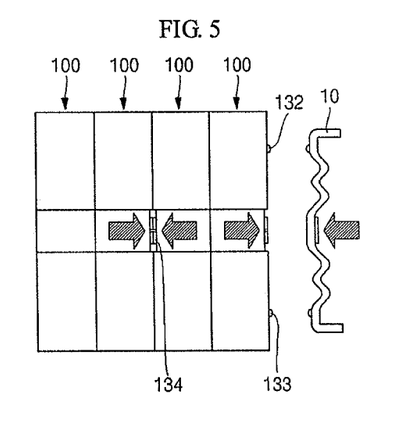
FIG. 5 illustrates a view schematically showing stacking of the secondary battery module of FIG. 1 and arranging a sealing member.

Hereinafter, a secondary battery module 100 according to an embodiment will be described. FIG. 1 illustrates an exploded perspective view of the secondary battery module according to the embodiment of the present invention. FIG. 2 illustrates a front view of the secondary battery of FIG. 1. FIG. 3 illustrates an exploded perspective view of a connection between battery cells and temperature sensors in the secondary battery module of FIG. 1. FIG. 4 illustrates a view schematically showing a connection between a module frame and a sealing member in the secondary battery module of FIG. 1. FIG. 5 illustrates a view schematically showing stacking of the secondary battery module of FIG. 1 and arranging a sealing member.

Referring to FIGS. 1 to 5, the secondary battery module 100 may include battery cells 110, temperature sensors 120 attached to surfaces of the battery cells 110, a front frame 130 and a rear frame 140 surrounding the battery cells 110 and sealing members 150 coupled to the front frame 130. A bottom frame 160 and a top frame 170 may be coupled to electrodes of the battery cells 110.

The battery cells 110 may have a cylindrical shape. Each of the battery cells 110 may have a body 111 and electrodes on upper and lower sides of the body 111. The electrodes may include a positive electrode 112 and a negative electrode 113, which may respectively protrude from the body 111. One of the positive 112 and negative 113 electrodes may be connected to the body 111.

The temperature sensors 120 may be attached to surfaces of the battery cells 110. The temperature sensors 120 may be attached to surfaces of the body 111 of the battery cell 110. Each of the temperature sensors 120 is preferably disposed on a central region of the body 111, where the highest temperature may be detected. The temperature sensors 120 may be, e.g., general thermocouples. An end of each temperature sensor 120 may have two different types of metal wires. The temperature sensors 120 may detect the surface temperatures of the battery cells 110.

The temperature sensors 120 may be wired to the outside of the secondary battery module 100 through conducting wires 121. Signals from the temperature sensor 120 may be transmitted to an external circuit through the conducting wires 121; and the external circuit may control charge and discharge operations of the secondary battery module 100 according to the surface temperatures of the battery cells 110.

The front frame 130, the rear frame 140, the bottom frame 160 and the top frame 170 may form a module frame of the secondary battery module 100 according to the present embodiment. The front frame 130 and the rear frame 140 may be coupled to each other from a front side and a rear side of the battery cells 110, respectively. The front frame 130 and the rear frame 140 may fix the position of the battery cells 110.

Insertion grooves 131 for insertion of the battery cells 110 may be disposed on an inner surface of the front frame 130. The front frame 130 may have stack recesses 132 and stack bosses 133 at designated locations for stacking of the front frame 130. The stack recesses 132 may be coupled to stack bosses 133 of another secondary battery module 100. The stack recesses 132 and the stack bosses 133 may increase the coupling strength of the secondary battery module 100 during stacking thereof Wire holes 134 through which the conducting wires 121 pass may be disposed at central portions of the front frame 130. The wire holes 134 may provide passages through which the temperature sensors 120 disposed on the battery cells 110 are connected to the external circuit via the conducting wires 121. Portions of the sealing member 150 may protrude from the wire holes 134 and the front frame 130 so that when a plurality of the secondary battery modules 100 according to the present embodiment are stacked, as will be described below, pressure may be applied to the sealing members 150 to firmly insert the sealing members 150 into the wire holes 134.

The sealing members 150 may be coupled to the wire holes 134 of the front frame 130. The conducting wires 121 may pass through an interior of the sealing members 150. The sealing members 150 may seal the wire holes 134 of the front frame 130. Therefore, the sealing members 150 may secure wiring paths of the conducting wires 121 and also prevent air for cooling the battery cell 110 from leaking through the wire holes 134. Thus, the sealing members 150 may fix wiring paths of the conducting wires 121 so that the temperature sensors 120 may be stably attached to surfaces of the battery cells 110; and the wire holes 134 may be sealed to prevent air from leaking therethrough.

Referring to FIG. 4, an angle (b) between side walls 150a of the sealing members 150 and an axis passing through the centers of the wire holes 134 may be less than an angle (a) between inner walls 134a of the wire holes 134 and the axis. When pressure is applied to the sealing members 150, they may be inserted into the wire holes 134 along the inner walls 134a of the wire holes 134. The sealing member 150 may include, e.g., ethylene propylene diene M-class (EPDM) rubber, ethylene propylene (EP) rubber, natural rubber, chloroprene rubber (CR), nitrile butadiene rubber (NBR), and combinations thereof. That is, the sealing members 150 may include an elastic rubber material. Since pressure may be applied to a top and sides of the sealing members 150, they may be stably coupled to the wire holes 134 by resilient forces.

Referring to FIG. 5, when the secondary module 100 is stacked according to the present embodiment, the sealing members 150 may seal the wire holes 134 using mutual pressures between the sealing members 150 of one secondary battery module 100 and sealing members 150 of another, facing secondary battery module 100. In the stacked secondary battery modules 100, the sealing members 150 of the outermost secondary battery module 100 may seal the wire hole 134 by pressure applied from coupling of an end plate 10.

The bottom frame 160 and the top frame 170 may be disposed on lower and upper sides of the battery cells 110. The bottom frame 160 and the top frame 170 may include electrode holes 161 and 171 corresponding to the electrodes 112 and 113 of the battery cells 110 so that the electrodes 112 and 113 are exposed to the outside. The bottom frame 160 and the top frame 170 may include bus bars (not shown) to electrically connect the battery cells 110.

As described above, in the secondary battery module 100 according to the present embodiment, the conducting wires 121 connecting the temperature sensors 120 to an external circuit may pass through the wire holes 134 of the front frame 130; and the wire holes 134 may be sealed with the elastic sealing members 150. Therefore, the temperature sensors 120 may be stably disposed on the battery cells 110 and may enhance cooling efficiency by preventing undesirable leakage of air for cooling the battery cells 110.

Figure 6:
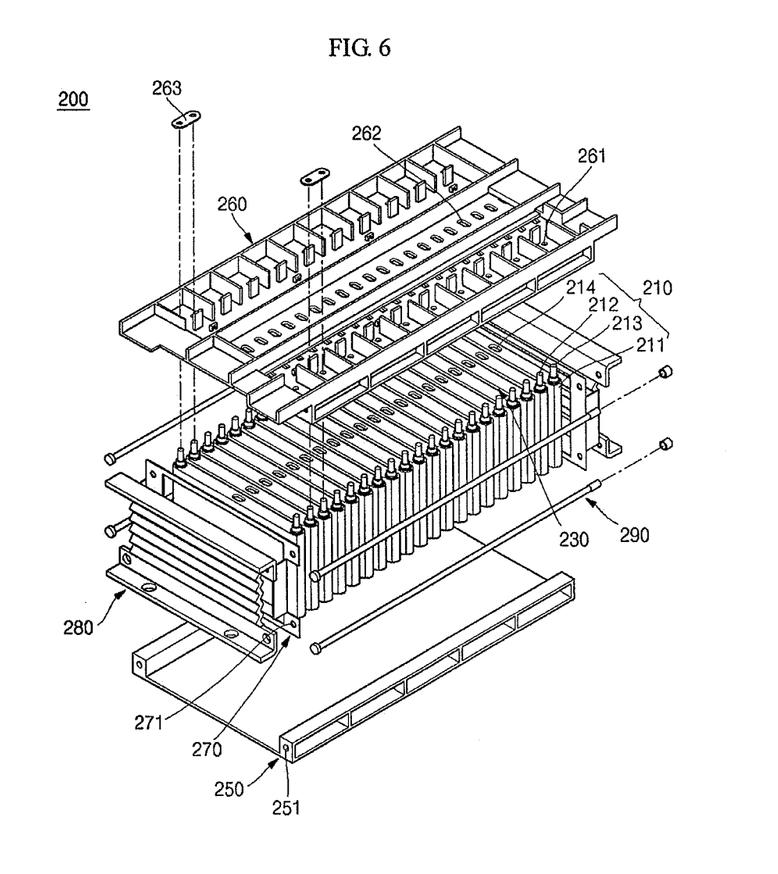
FIG. 6 illustrates an exploded perspective view of a secondary battery module according to another embodiment.
Figure 7:
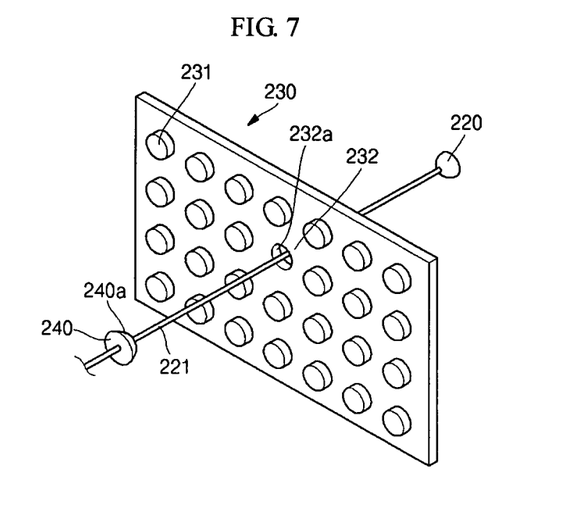
FIG. 7 illustrates a view schematically showing a connection between a temperature sensor and a cell partition wall in the secondary battery module of FIG. 6.
Figure 8:
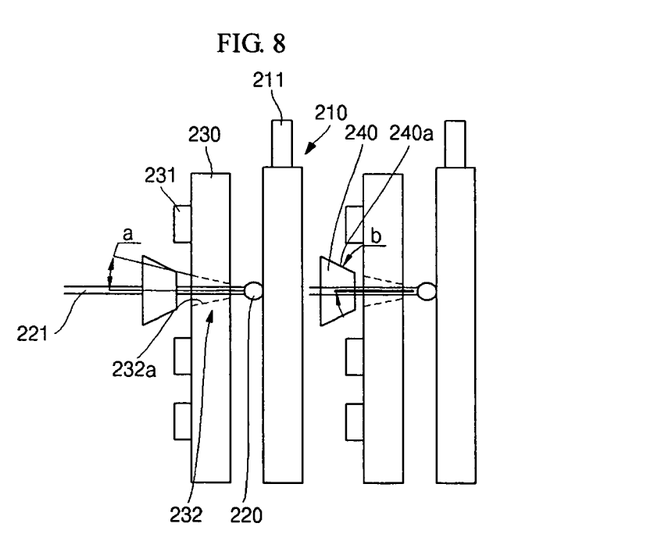
FIG. 8 illustrates a view schematically showing a connection between a battery cell, a temperature sensor, a cell separator, and a sealing member in the secondary battery module of FIG. 6.

Hereinafter, a secondary battery module 200 according to another embodiment will be described. FIG. 6 illustrates an exploded perspective view of a secondary battery module according to the embodiment. FIG. 7 illustrates a view schematically showing a connection between a temperature sensor and a cell partition wall in the secondary battery module of FIG. 6. FIG. 8 illustrates a view schematically showing a connection between a battery cell, a temperature sensor, a cell separator and a sealing member in the secondary battery module of FIG. 6.

Referring to the FIGS. 6 to 8, the secondary battery module 200 according to the present embodiment may include a plurality of battery cells 210, temperature sensors disposed on surfaces of the battery cells 210, cell separators 230 between the battery cells 210, sealing members 240 disposed on the cell separator 230, a bottom frame 250 on a lower side of the battery cells 210, a top frame 260 on an upper side of the battery cells 210, end frames 270 on sides of the battery cells 210, end plates 280 outside the end frames 270 and coupling members 290 along an arrangement direction of the battery cells 210.

A plurality of battery cells 210 may be provided in the secondary battery module 100. The battery cells 210 may have a polygonal shape. Each battery cell 210 may include a case 211, electrodes 212 and 213 protruding towards the upper side of a plate sealing the case 211 and a vent 214 on a top surface of the plate. The battery cells 210 may be arranged in a first direction and may be electrically connected to each other.

The temperature sensors 220 may be disposed on surfaces of the battery cells 210. Each temperature sensor 220 may include the same general thermocouple 120 used in the above-described embodiment.

The temperature sensors 220 may be wired to the outside of the secondary battery module 200 through conducting wires 221. Hence, signals from the temperature sensors 220 may be transmitted to an external circuit through the conducting wires 221. The external circuit may control charging and discharging operations of the secondary battery according to surface temperatures of the battery cells 210.

The cell separators 230, the bottom frame 250, the top frame 260, the end frames 270 and the end plates 280 may form a module frame structure of the secondary battery module 200 according to the present embodiment. The cell separators 230 may be between the battery cells 210. A plurality of bosses 231 may be on a surface of each cell separator 230. The bosses 231 may be arranged along the surface of the cell separator 230 at regular intervals. Therefore, the cell separators 230 may separate the battery cells 210 from each other by a predetermined distance using the bosses 231.

Wire holes 232 may be disposed in the cell separators 230 where some bosses would be located, instead of the bosses. In other words, at regular intervals, a wire hole 232 may replace a boss on the cell separator 230. The wire holes 232 may be between the bosses 231 of the cell separators 230. The conducting wires 221 of the temperature sensors 220 may pass through the wire holes 232. Furthermore, since spaces may be formed between the battery cells 210 by the bosses 231 of the cell separators 230, the conducting wires 221 may be easily connected to the external circuit through the spaces.

The sealing members 240 may seal the wire holes 232 of the cell separators 230. Since the conducting wires 221 may pass through an interior of the sealing members 240, the positions of the conducting wires 221 may be fixed by the coupling forces between the sealing members 240 and the wire holes 232. Each sealing member 150 may include, e.g., ethylene propylene diene M-class (EPDM) rubber, ethylene propylene (EP) rubber, natural rubber, chloroprene rubber (CR), nitrile butadiene rubber (NBR), and combinations thereof An angle (b) between a side wall 240a of the sealing member 240 and an axis passing through the wire hole 232 may be larger than an angle (a) between an inner wall 232a of the wire hole 232 and the axis. The battery cells 210 may apply pressure to a portion of the sealing member 240 protruding from the cell separator 230 to seal the wire hole 232. The sealing member may protrude from the wire hole 232 and have the same height as that of the bosses 231. Thus, the sealing member 240 may be inserted into and may seal the wire hole 232 due to pressure applied from the coupled battery cells 210.

The bottom frame 250 may be disposed on a lower side of the battery cells 210. The bottom frame 250 may support the battery cells 210 from the bottom. The bottom frame 250 may include holes 251 disposed in a lengthwise direction thereof such that the coupling members 290 may be coupled thereto. As a result, the bottom frame 250 may be coupled to the top frame 260, the end frame 270 and the end plate 280.

The top frame 260 may be disposed on an upper side of the battery cell 210.

The top frame 260 may include holes 261 so that the electrodes 212 and 213 of the battery cells 210 pass through the holes 261 and the electrodes 212 and 213 of the battery cells 210 are exposed to the top of the top frame 260. Furthermore, the top frame 260 may have vent holes 262 for easy emission of gases. The battery cells 210 may be electrically connected to each other by bus bars 263 connected to the electrodes 212 and 213 of the battery cells 210 from a top of the top frame 260. Although not illustrated, the top frame 260 may include holes formed along the first direction so that the battery cells 210 are connected to each other by the coupling members 290.

The end frames 270 may be disposed at ends of the arranged battery cell 210.

The end frames 270 may be fixed along the first direction. The end frames 270 may include holes 271 coupled to the coupling member 290.

The end plates 280 may be disposed outside the end frames 270. The end plates 280 may include holes coupled to the coupling member 290. As a result, the end plates 280 may firmly couple the battery cells 210 along the first direction.

The coupling members 290 may be disposed on sides of the battery cells 210 and along the first direction. The coupling members 290 may apply pressure to the end plates 280 so that the battery cells 210 are fixed by the pressure. The coupling members 290 may also apply pressure to the sealing members 240 to seal the wire holes 232. Each coupling member 290 may include a connecting rod and a nut coupled to the connecting rod to couple together the bottom frame 250, the top frame 260, the end frames 260 and the end plates 280.

As described above, the secondary battery module 200 according to the present embodiment may include wire holes 232 in the cell separators 230 between the battery cells 210; and the conducting wires 221 connected to the temperature sensors 220 may be wired through the wire holes 232. The wire holes 232 may be sealed by the sealing members 240 and the conducting wires 221. The temperature sensors 220 may be stably disposed on surfaces of the battery cells 210 so that undesirable leakage of air for cooling the battery cells 210 through the existing wire holes is prevented.

Generally, disposing a temperature sensor on each battery cell and controlling charge/discharge of the battery module using a control circuit connected to the temperature sensor has been suggested. In a secondary battery module having a plurality of battery cells, however, a temperature sensor disposed on each battery cell requires a wiring path for a conducting wire to be connected to an external control circuit. Without a proper sealing member, the wiring path may leak cooling air introduced into the battery module, deteriorating cooling and overall reliability.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery module, comprising:
    a plurality of battery cells, each battery cell having a surface;
    a temperature sensor disposed on the surface of at least one of the battery cells;
    a conducting wire connected to the temperature sensor;
    a module frame coupled to the battery cells and fixing the battery cells in a position, the module frame having a wire hole through which the conducting wire passes; and
    a sealing member surrounding the conducting wire and coupled to the wire hole and sealing the wire hole, wherein:
    the wire hole includes an inner wall and a center,
    the sealing member includes a side wall,
    an axis passes through the center of the wire hole,
    the inner wall of the wire hole is inclined at an angle with respect to the axis, and
    the side wall of the sealing member is inclined at an angle with respect to the axis, the angle at which the inner wall of the wire hole is inclined is different from the angle at which the side wall of the sealing member is inclined.

2. The secondary battery module as claimed in claim 1, wherein the sealing member includes at least one of ethylene propylene diene M-class (EPDM) rubber, ethylene propylene (EP) rubber, natural rubber, chloroprene rubber (CR), and nitrile butadiene rubber (NBR).

3. The secondary battery module as claimed in claim 1, wherein:
    the wire hole has an inside, and
    the sealing member is coupled to the inside of the wire hole by the application of external pressure.

4. The secondary battery module as claimed in claim 1:
    including a plurality of the sealing members;
    wherein the battery cells are cylindrical battery cells, and
    wherein one sealing member faces and applies pressure to at least one other sealing member to couple the other sealing member to the wire hole.

5. The secondary battery module as claimed in claim 1, wherein:
    the module frame includes end plates, and
    the end plates apply pressure to the sealing member to couple the sealing member to the wire hole.

6. The secondary battery module as claimed in claim 1, wherein:
    the angle at which the inner wall of the wire hole is inclined is greater than the angle at which the side wall of the sealing member is inclined.

7. The secondary battery module as claimed in claim 1, wherein the sealing member is in the wire hole.

8. The secondary battery module as claimed in claim 1, wherein:
    the battery cells are polygonal battery cells,
    the module frame includes cell separators between the battery cells, the cell separators having a surface and bosses on the surface, and
    the wire hole is on the cell separators and disposed between the bosses.

9. The secondary battery module as claimed in claim 8, wherein:
    the bosses have a height,
    the sealing member protrudes from the wire hole to have a height, and
    the height of the sealing member is the same as the height of the bosses.

10. The secondary battery module as claimed in claim 1, wherein:
    the battery cells are polygonal battery cells,
    the module frame includes cell separators between the battery cells, the cell separators having a surface and bosses arranged at a regular interval on the surface, and
    the wire hole is disposed on the cell separator in place of at least one of the bosses.

11. The secondary battery module as claimed in claim 1, wherein:
    the angle at which the inner wall of the wire hole is inclined is less than the angle at which the side wall of the sealing member is inclined.

12. A secondary battery module, comprising:
    a plurality of battery cells, each battery cell having a surface;
    a temperature sensor disposed on the surface of at least one of the battery cells;
    a conducting wire connected to the temperature sensor;
    a module frame coupled to the battery cells and fixing the battery cells in a position, the module frame having a wire hole through which the conducting wire passes; and
    a sealing member surrounding the conducting wire and coupled to the wire hole and sealing the wire hole, wherein:
    the battery cells are polygonal battery cells,
    the module frame includes cell separators between the battery cells, the cell separators having a surface and bosses on the surface,
    the wire hole is on the cell separators and disposed between the bosses,
    the bosses have a height,
    the sealing member protrudes from the wire hole to have a height, and
    the height of the sealing member is the same as the height of the bosses.

* * * * *